United States Patent [19]
Goldman

[11] 3,895,605
[45] July 22, 1975

[54] AQUARIUM EQUIPMENT ORGANIZER

[75] Inventor: Marvin A. Goldman, Great Neck, N.Y.

[73] Assignee: Penn-Plax Plastics, Inc., Garden City, N.Y.

[22] Filed: Apr. 1, 1974

[21] Appl. No.: 457,110

[52] U.S. Cl. .................................. 119/5; 211/88
[51] Int. Cl. .......................................... A01k 63/00
[58] Field of Search .............................. 119/2–5; 211/88, 90

[56] References Cited
UNITED STATES PATENTS

| | | | |
|---|---|---|---|
| 1,697,711 | 1/1929 | Brown | 211/88 |
| 1,863,471 | 6/1932 | Colaizzi | 211/88 |
| 2,568,147 | 9/1951 | Fulton | 211/90 X |
| 2,783,893 | 3/1957 | Romanoff | 119/5 X |

Primary Examiner—Louis G. Mancene
Assistant Examiner—J. N. Eskovitz
Attorney, Agent, or Firm—Mandeville and Schweitzer

[57] ABSTRACT

An arrangement of apparatus is provided for supporting in organized fashion a variety of equipment and supplies for a home and/or hobby aquarium, which apparatus is configured to hang from the frame of an aquarium and is expandable to accommodate differing quantities of supplies and equipment at any one time. Included herewith are integral holders for securing and organizing air lines and to prevent siphoning action through those air lines, and a hanger for supporting nets.

4 Claims, 5 Drawing Figures

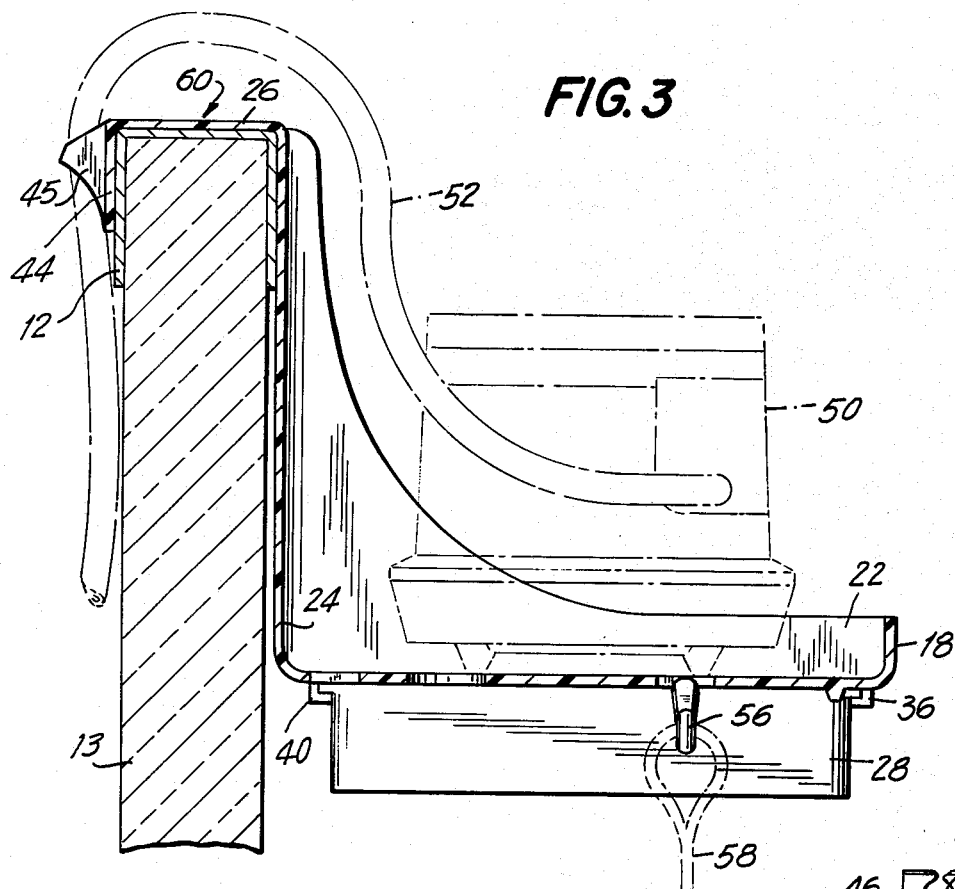
FIG. 3
FIG. 5
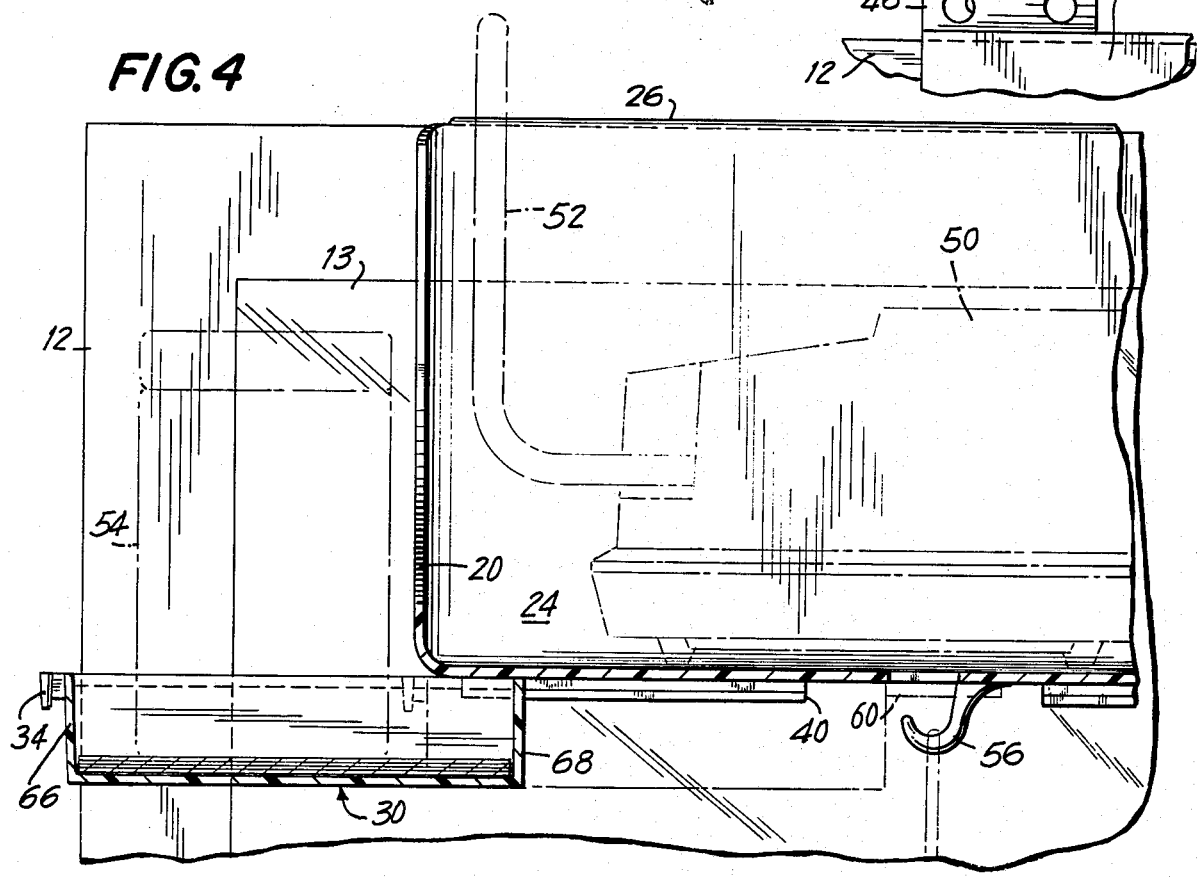
FIG. 4

AQUARIUM EQUIPMENT ORGANIZER

SUMMARY OF THE INVENTION

Generally, this invention relates to an arrangement of apparatus for use with aquariums for supporting and/or storing the associated equipment and supplies utilized in the activities pertinent to operating such aquariums. More particularly, this invention relates to such an organizer which is in the form of a supporting tray with an integral flanged hanger for supporting the tray in adjustable manner from the top edge of any aquarium, and including at least one slidable tray associated therewith for expanding the storage capacity and/or surface of the organizer for accommodating increased quantities of supplies and equipment at any one time.

BACKGROUND OF THE INVENTION

As will be apparent, in the operation of a home and/or hobby sized aquarium, or one of comparable size used for display purposes in a retail store, there is a variety of equipment and supplies necessary for maintaining the aquarium in continuous operating condition at all times. For example, air pumps are conventionally used to oxygenate the water in the aquarium. Moreover, various filtering equipment may be associated with the air lines leading to and from the aquarium and air pumps for filtering out impurities in the water contained in the aquarium. In addition, there will be differing quantities of additives and food supplies available depending upon the number and variety of fish being maintained in the aquarium. As will be appreciated, this plethora of equipment and supplies should be readily available near the aquarium for use at appropriate times for the efficient maintenance and management of the aquarium population. Moreover, if unorganized or if placed in haphazard fashion in the area adjacent where the aquarium is displayed, such equipment and supplies present an unsightly appearance. This is true particularly when the aquarium is displayed in a home as part of the decor.

STATEMENT OF THE INVENTION

With this invention, a structure or arrangement of organizer apparatus is provided which may be supported from the top of one wall of the aquarium and which will accommodate the equipment and supplies necessary for maintaining continuous and efficient operation of the aquarium. Moreover, additional telescoping surfaces are provided in association with the structure of the invention, to selectively increase the supporting surface, if desired, for additional equipment and supplies. The organizer of the invention is configured to include integral therewith, a supporting flange which will accommodate differing sizes of aquarium wall widths.

The structure of the invention includes integral air lines supporting flanges which hold those lines in a secure and organized manner and which have the additional advantage of preventing siphoning action through the air lines from the aquarium tank back to the air pumps.

The expandable organizer includes shallow telescoping trays. If the additional supporting surfaces are not required, the trays may be utilized as closed drawers for storage of small supplies used in the maintenance of the aquarium.

Other objects and advantages of this invention will be apparent from the following description, the accompanying drawings and the appended claims.

DESCRIPTION OF THE DRAWINGS

FIGS. 2 and 3 are enlarged transverse, cross-sectional views of the new apparatus taken along lines 2—2 and 3—3, respectively, of FIG. 1;

FIG. 4 is an enlarged longitudinal cross-sectional view taken along line 4—4 of FIG. 1; and FIG. 5 is a fragmentary plan view of the apparatus taken along line 5—5 of FIG. 1.

DETAILED DESCRIPTION OF THE INVENTION

Figure 1:
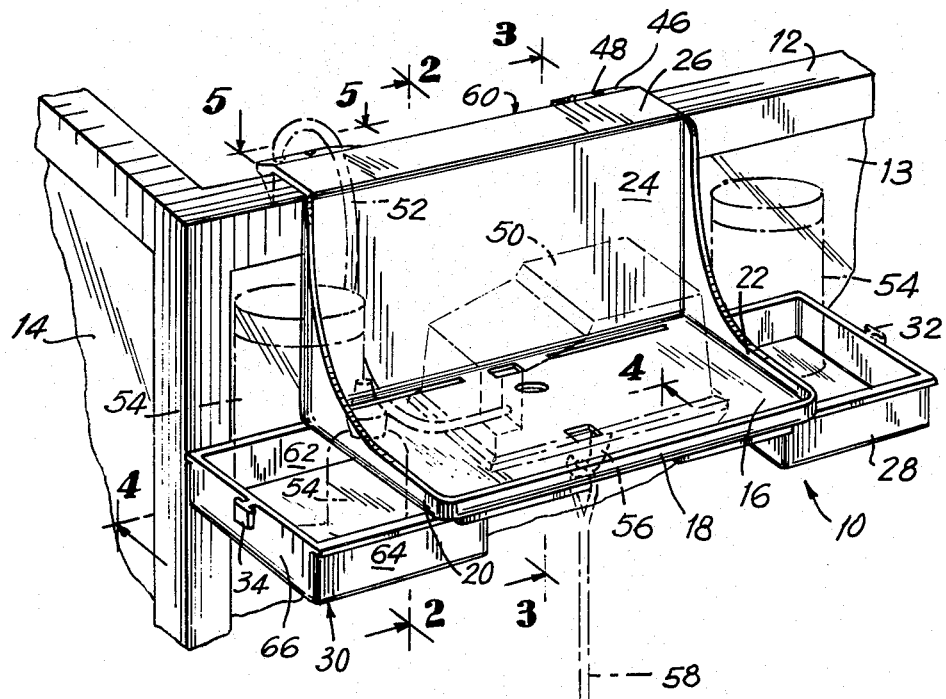
FIG. 1 is a perspective view of the organizer apparatus of the invention shown in its expanded form and supported from the top of a wall of an aquarium tank.

Referring now to the drawings in which like reference numerals refer to like parts throughout the several views thereof, FIG. 1 shows the arrangement of the organizer apparatus 10 of the invention in its expanded form including aquarium equipment and supplies. The organizer apparatus 10, itself, is suspended from the top of a frame 12 for the glass wall 13 of an aquarium tank. The organizer 10 is comprised of a central supporting tray 16 having a short front wall 18 and narrow end walls 20 and 22.

Figure 2:
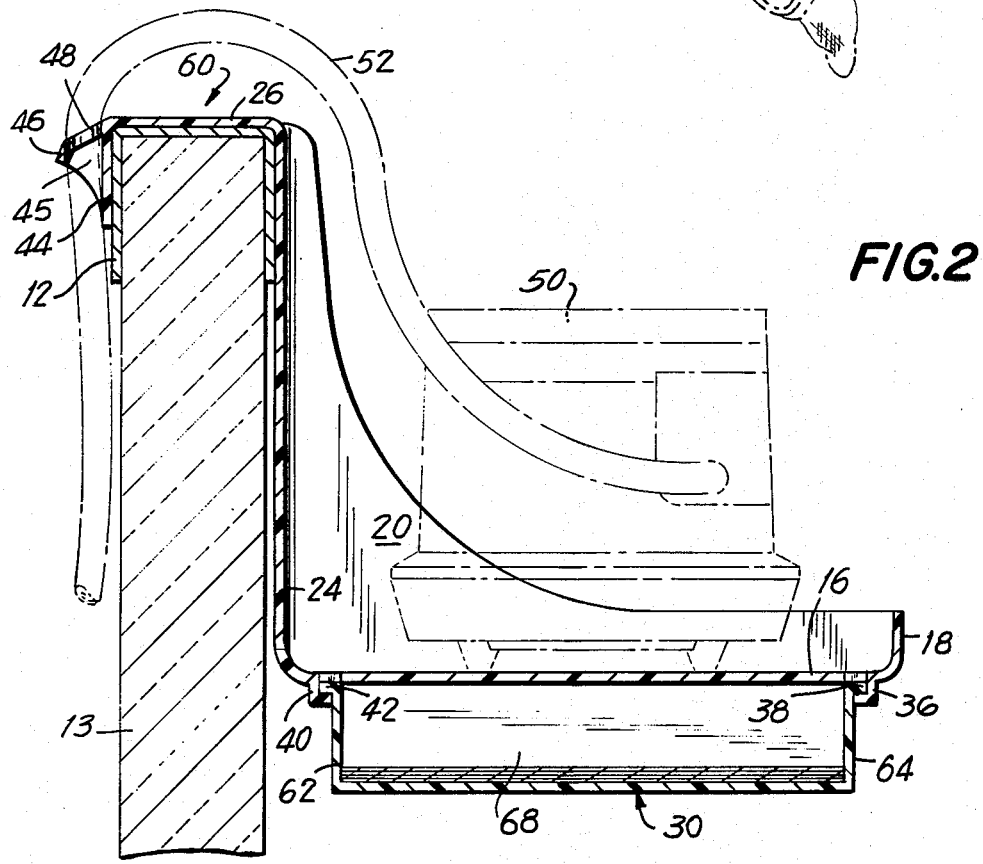

A horizontal flange 26, integral with vertical rear wall 24, extends rearwardly from wall 24 over the top surface of frame 12 of aquarium wall 13. As shown in FIG. 2, flange 26 has an outwardly and downwardly extending stabilizing lip 44 which, with the flange 26 and wall 24 forms a hanger bracket 60 for the organizer. The lip 44 includes an extension 46, reinforced by webs 45, with a plurality of openings 48 (FIG. 5) for receiving and maintaining in organized fashion a plurality of air hoses 52, which may extend from an air pump 50, shown in phantom, supported on tray 16. Slidably, telescopically supported at each end of central supporting tray 16 are two additional supporting trays 28, 30, which may be telescopically extended, as shown in FIG. 1, from tray 16 to provide additional supporting surfaces for equipment and/or supplies 54, (shown in phantom as representative) as shown in FIG. 1. Since slidable trays 28, 30 are identical, only tray 30 need be described in detail.

Tray 30 is comprised of a front wall 64, a rear wall 62, and end walls 66, 68 (FIG. 4). Integral with end wall 66 is a pull 34 for grasping and sliding tray 30 outwardly and inwardly as desired for increasing or decreasing the supporting surface required in the use of the structure of the invention. As illustrated in FIGS. 2 and 3, angled flanges 36 and 40, respectively, are integral with the front wall 18 and rear wall 24 of central tray 16. These flanges 36, 40 form opposed sliding grooves or tracks for supporting and retaining mating flanges 38, 42, which are formed integrally with the front and rear walls 64, 62, respectively, of the tray 30. The cooperation between flanges 36, 38 and 40, 42 provides telescopic, slidable support for tray 30 beneath the central tray 16.

In accordance with the invention, the trays 28, 30 may be pulled out to expand the total supporting surface of organizer structure 10, or, in the alternative, when retracted these trays 28, 30 function as small closed drawers.

As shown in FIG. 4, an integral hook 56 extends from tray 16 for supporting additional equipment, such as a net 58. Furthermore, an abutment 60 is formed integrally with the lower surfaces of tray 16 to limit the inward movement of the trays 28, 30, as will be understood.

As will be apparent from the above description, the central supporting tray 16 and its associated hanger structure for suspending it from an aquarium wall may be comprised of a single, integral molded element of, for example, high impact polystyrene or comparable plastic. Since the slidable extension trays 28, 30 are duplicates of one another, these parts may be formed in a similar manner, thus making the entire structure producible fron only two molds.

While the arrangement of the organizer apparatus herein described constitutes a preferred embodiment of the invention, it is to be understood that the invention is not limited to this precise arrangement of apparatus, and that changes may be made therein without departing from the scope of the invention which is defined in the appended claims.

I claim:
1. An organizer apparatus for use with an aquarium tank or the like, which comprises
   a. a central supporting tray including a horizontal bottom wall having a first predetermined article-supporting surface area and integral upstanding front and side walls;
   b. an integral upstanding rear wall of greater height than said front and side walls;
   c. an integral bracket means formed at upper portions of said rear wall for suspending said tray from and below the upper edge of an aquarium tank;
   d. pairs of opposed, spaced parallel, integral L-shaped brackets formed on the lower surface of said bottom wall;
   e. at least one auxiliary equipment tray with upstanding walls about its perimeter; and
   f. outwardly entending integral horizontal flanges on said tray side walls for cooperating, sliding engagement with said opposed L-shaped brackets, providing at least one second article-supporting surface area slidingly, telescopically supported beneath said central tray for selective incremental expansion of the total exposed article-supporting surface area of said organizer apparatus.

2. An organizer apparatus in accordance with claim 1, in which
   a. said bracket means includes a plurality of openings for receiving and supporting aquarium air lines.

3. An organizer apparatus in accordance with claim 1, in which
   a. at least one integral hook means depends from the lower surface of said bottom wall of the central tray.

4. Apparatus as recited in claim 1, in which
   a. two auxiliary trays are slidingly engaged on said L-shaped brackets, with one each on each end of said central supporting tray;
   b. an integral handle disposed in one side wall of each of said trays; and
   c. integral stop means on the bottom surface of said bottom wall for limiting the travel of said auxiliary trays.

* * * * *